United States Patent
Holtcamp

(10) Patent No.: US 7,385,015 B2
(45) Date of Patent: Jun. 10, 2008

(54) TRIALKYLALUMINUM TREATED SUPPORTS

(75) Inventor: Matthew W. Holtcamp, Huffman, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 135 days.

(21) Appl. No.: 11/220,164

(22) Filed: Sep. 6, 2005

(65) Prior Publication Data

US 2006/0079394 A1   Apr. 13, 2006

Related U.S. Application Data

(60) Provisional application No. 60/617,952, filed on Oct. 12, 2004.

(51) Int. Cl.
*C08F 4/02* (2006.01)
*C08F 4/6392* (2006.01)
*C08F 4/6592* (2006.01)

(52) U.S. Cl. .............. 526/160; 526/129; 526/943; 526/348; 502/104; 502/120; 502/152

(58) Field of Classification Search ............ 502/120, 502/232, 104, 152; 526/129, 160, 348, 943
See application file for complete search history.

(56) References Cited

U.S. PATENT DOCUMENTS

| | | | | |
|---|---|---|---|---|
| 4,295,999 A | 10/1981 | Slaugh | ......... | 252/455 |
| 4,912,075 A | 3/1990 | Chang | ......... | 502/107 |
| 4,914,253 A | 4/1990 | Chang | ......... | 585/523 |
| 4,925,821 A | 5/1990 | Chang | ......... | 502/107 |
| 4,935,397 A | 6/1990 | Chang | ......... | 502/117 |
| 4,937,217 A | 6/1990 | Chang | ......... | 502/111 |
| 4,937,301 A | 6/1990 | Chang | ......... | 526/128 |
| 5,008,228 A | 4/1991 | Chang | ......... | 502/111 |
| 5,086,025 A | 2/1992 | Chang | ......... | 502/117 |
| 5,147,949 A | 9/1992 | Chang | ......... | 526/129 |
| 5,238,892 A | 8/1993 | Chang | ......... | 502/111 |
| 6,159,888 A | 12/2000 | Welch et al. | ......... | 502/117 |
| 6,300,271 B1 | 10/2001 | McDaniel et al. | ......... | 502/104 |
| 6,376,415 B1 | 4/2002 | McDaniel et al. | ......... | 502/113 |
| 6,391,816 B1 | 5/2002 | McDaniel et al. | ......... | 502/107 |
| 6,395,666 B1 | 5/2002 | McDaniel et al. | ......... | 502/87 |
| 6,492,293 B1 | 12/2002 | Speakman | ......... | 502/129 |
| 6,524,987 B1 | 2/2003 | Collins et al. | ......... | 502/128 |
| 6,531,550 B1 | 3/2003 | McDaniel et al. | ......... | 526/97 |
| 6,548,441 B1 | 4/2003 | McDaniel et al. | ......... | 502/84 |
| 6,548,442 B1 | 4/2003 | McDaniel et al. | ......... | 502/113 |
| 6,576,583 B1 | 6/2003 | McDaniel et al. | ......... | 502/104 |
| 6,613,712 B1 | 9/2003 | McDaniel et al. | ......... | 502/104 |
| 6,613,852 B2 | 9/2003 | McDaniel et al. | ......... | 526/160 |
| 6,632,894 B1 | 10/2003 | McDaniel et al. | ......... | 526/89 |
| 6,667,274 B1 | 12/2003 | Hawley et al. | ......... | 502/415 |
| 2001/0044374 A1 | 11/2001 | Payne | ......... | 502/111 |
| 2003/0228971 A1 | 12/2003 | Meverden et al. | ......... | 502/103 |
| 2003/0232716 A1 | 12/2003 | McDaniel et al. | ......... | 502/115 |

FOREIGN PATENT DOCUMENTS

| | | |
|---|---|---|
| EP | 0 170 059 | 2/1986 |
| EP | 0 739 360 | 10/1996 |
| EP | 1 125 952 | 8/2001 |
| WO | 01/44309 | 6/2001 |
| WO | WO 2006/044058 | 4/2006 |

OTHER PUBLICATIONS

Abstract, EP 0 170 059, "Polymerization of Ethylene, Optionally with 1-alkenes", published Oct. 11, 1995.

*Primary Examiner*—Caixia Lu
(74) *Attorney, Agent, or Firm*—Catherine L. Bell

(57) ABSTRACT

This invention relates to a process to prepare a trialkylaluminum treated support comprising: 1) combining a support with first trialkylaluminum compound(s), where the alkyl groups have at least 2 carbon atoms; then 2) calcining the combination of the support and the trialkylaluminum compound(s); then 3) combining the calcined support with second trialkylaluminum compound(s), where the alkyl groups have at least 2 carbon atoms; where the first and second trialkylaluminum compound(s) may be the same or different. This invention further relates to catalyst systems comprising catalyst compounds and such supports, as well as processes to polymerize unsaturated monomers using the supports in combination with catalyst compounds.

19 Claims, No Drawings

TRIALKYLALUMINUM TREATED SUPPORTS

CROSS REFERENCE TO RELATED APPLICATION

This application claims priority to U.S. Provisional Patent Application No. 60/617,952, filed Oct. 12, 2004.

FIELD OF THE INVENTION

The present invention relates to treated supports, to polymerization catalyst systems containing these supports and to polymerization processes utilizing the same. In particular, this invention relates to supports comprising silica that has been treated with a trialkylaluminum (where the alkyl has at least 2 carbon atoms), calcined, treated with trialkylaluminum again (where the alkyl has at least 2 carbon atoms).

BACKGROUND OF THE INVENTION

Metallocene olefin polymerization catalyst systems typically use an activator (also called a co-catalyst) to generate the active catalytic species. In general, there are two catalyst activator families: partially hydrolyzed aluminum alkyl complexes and non-coordinating anions (NCA's). Some of the most commonly employed activators used today are the partially hydrolyzed aluminum alkyls, more specifically, alumoxanes, such as methylalumoxane (MAO). In general, metallocene olefin polymerization systems that utilize NCA-type activators are more active than their MAO counterparts, but are also quite costly and sensitive to poisons which present a problem in catalyst synthesis, handling, storage and reactor operation. Alternatively, MAO-based systems are more robust than their NCA-type counterparts, but they suffer from the high cost of MAO production, the fact that MAO is typically used in large excess (relative to the amount of metallocene) and the limited shelf life of MAO.

In order to enhance polymer morphology, metallocene polymerization catalysts operated in industrial slurry and gas phase processes are typically immobilized on a carrier or a support, such as alumina or silica. Metallocenes are supported to enhance the morphology of the forming polymeric particles such that they achieve a shape and density that improves reactor operability and ease of handling. However, the supported versions of metallocene polymerization catalysts tend to have lower activity as compared to their homogeneous metallocene counterparts without a support. In general, metallocene and single-site catalysts are immobilized on silica supports.

Thus there is a need in the industry to find faster, cheaper and more efficient ways to activate metallocene catalyst compounds and there is also a need in the industry to find faster, cheaper and more efficient ways to support metallocene catalyst compounds.

Others have treated a calcined silica support with triethylaluminum and used it without further calcination as a support for metallocene catalyst systems.

Of possible interest is U.S. Pat. No. 6,492,293 which discloses a catalyst for polymerization which comprises a late transition metal complex, optionally an activator compound, and a support which has been impregnated with titanium or aluminum and then calcined after impregnation. Another reference of possible interest is US 2003/0228971 which describes treating silica with hydrophobicizing agents (such as hexamethyldisilazane or trimethylmethoxysilane) followed by calcining. This support is then used to support metallocene/ionic activator catalysts, dried, and then treated with metal alkyls (see Ex. 1, 2 and 4) to "prealkylate" the catalyst.

Other references of interest include those where an undehydrated (or dried and then treated with water) silica support is treated with trimethylaluminum and used without further calcination as a support for metallocene catalysts, such as U.S. Pat. Nos. 4,912,075, 4,914,253, 4,925,821, 4,935,397, 4,937,217, 4,937,301, 5,008,228, 5,086,025, 5,147,949, 5,238,892, EP0739360, U.S. Pat. No. 6,159,888, EP0170059, US20010044374-A, and EP1125952.

Other references of interest include those that disclose treatments of silica, silica-alumina, or alumina with chemicals other than organoaluminum species (e.g. fluorides, chlorides, chromium, molybdenum, tungsten, vanadium, zinc, boron, titanium, zirconium, nickel, sulfates, triflate, bentonite, etc.), followed by calcination, loading with metallocene and triethylaluminum (or other organoaluminum species), and use thereof for polymerization, including WO0144309, U.S. Pat. Nos. 6,300,271, 6,376,415, 6,391,816, 6,395,666, 6,524,987, 6,531,550, 6,548,441, 6,548,442, 6,576,583, 6,613,712, 6,613,852, 6,632,894, US20030232716, and U.S. Pat. No. 6,667,274.

SUMMARY OF THE INVENTION

This invention relates to a process to prepare a support comprising:

1) combining a support with trialkylaluminum compound(s), where the alkyl groups have at least 2 carbon atoms; then 2) calcining the combination of the support and the trialkylaluminum compound(s); then 3) combining the calcined support with additional trialkylaluminum compound(s), where the alkyl groups have at least 2 carbon atoms.

This invention further relates to catalyst systems comprising catalyst compounds and such treated supports, as well as processes to polymerize unsaturated monomers using the supported catalyst compounds.

This invention also relates to a method for preparing an active supported catalyst comprising:

a) removing polar surface groups by treatment with an aluminum alkyl and calcination;

b) contacting the treated support with further aluminum alkyl; and c) contacting the aluminum alkyl treated support with a halogen-free transition metal catalyst compound.

DETAILED DESCRIPTION

For the purposes of this patent specification and the claims thereto, the term "activator" is used interchangeably with the term "co-catalyst", the term "catalyst" of "catalyst compound" refers to a metal compound that when combined with an activator (such as the treated supports described herein) polymerizes olefins, and the term "catalyst system" refers to the combination of a catalyst compound and a treated support, with or without additional activator. The terms "support" or "carrier," for purposes of this patent specification, are used interchangeably.

This invention relates to a process to prepare a support comprising:

1) combining a support, preferably silica, with a trialkylaluminum compound, where the alkyl groups have at least 2 carbon atoms; then 2) calcining the combination of the support and the trialkylaluminum; then 3) combining the calcined support with additional trialkylaluminum, where the alkyl groups have at least 2 carbon atoms.

This invention further relates to a process to prepare a supported catalyst system comprising:
1) combining a support, preferably silica, with trialkylaluminum compound(s), where the alkyl groups have at least 2 carbon atoms; then,
2) calcining the combination of the support and the trialkylaluminum compound(s); then,
3) combining the calcined support with additional trialkylaluminum compound(s), where the alkyl groups have at least 2 carbon atoms; then,
4) combining the combination of the calcined support and the trialkylaluminum compound(s) with a catalyst compound and diluent; then,
5) optionally, removing the diluent.

In a preferred embodiment, the trialkylaluminum compound is represented by the formula $Al(R)_3$, where each R is independently selected from the group consisting of C2 to C40 alkyl groups, preferably C2 to C20 linear, branched or cyclic alkyl groups, more preferably each R is independently selected from the group consisting of ethyl, propyl, isopropyl, butyl, n-butyl, isobutyl, tertiary-butyl, pentyl, hexyl, cylohexyl, heptyl, octyl, nonyl, decyl, undecyl, dodecyl, phenyl, and naphthyl.

In another embodiment, each R is independently selected from the group consisting of ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, decadienyl, phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl.

In a preferred embodiment, all R groups are the same. In another embodiment, each R group is different from the other R groups.

Preferred trialkylaluminum compounds include triethylaluminum (TEAL), trimethylaluminum (TMAL), tri-isobutylaluminum (TIBAL) and tri-n-hexylaluminum (TNHAL). TEAL is particularly preferred for use as a trialkylaluminum compound.

In a preferred embodiment, the trialkylaluminum used before the support is calcined is the same as the trialkylaluminum used after the support is calcined. In another preferred embodiment, the trialkylaluminum used before the support is calcined is different from the trialkylaluminum used after the support is calcined.

The trialkylaluminum is typically combined with the support in a weight ratio of 0.05:1 to 1:1000 (trialkylaluminum:support, not including any solvent or diluent), preferably at a weight ratio of 0.01:1 to 1:20, preferably a weight ratio of 1:1 to of 1:10, preferably from 1:1 to 1:2. The trialkylaluminum compound may be directly combined with the support or may be combined with a solvent or diluent prior to or during combination with the support. Preferred solvents/diluents include, butane, pentane, isopentane, hexane, heptane, octane, nonane, cyclopentane, cyclohexane, benzene, toluene, ethylbenzene, diethylbenzene and the like. If the trialkylaluminum compound is combined with a solvent or diluent it is typically present at about 0.01 to 95 weight %. Generally, the mixture of the trialkylaluminum, the solvent/diluent and the support may be mixed by hand with a spatula, by a rotating stirrer with wire loops, by metal blades rotating at high speed, by a helical ribbon bladed mixer, by shaking, tumbling, fluidized bed mixing, by paddle or propeller blades on a rotating stir shaft, or other appropriate means. The solution/suspension of trialkylaluminum and support may be dried in some fashion, for example, rotovaped, before it is calcined.

The combination of the support and the trialkylaluminum is then calcined. Calcining is defined to be heating the support at a temperature of 300 to 1000° C. (preferably 300 to 800° C., preferably 300 to 600° C.) for a period of at least 30 minutes, preferably at least 1 to 12 hours. Preferably the calcining occurs under a vacuum, under nitrogen or under air. Typically, after calcining, the trialkylaluminum is present on the support in amounts of 0.05 to 15 weight %, preferably 1 to 14 weight %, more preferably 2 to 10 weight %.

Thereafter another trialkylaluminum (which may be the same or different from the first trialkylaluminum) is combined with the calcined support in a weight ratio of 0.05:1 to 1:1000 (trialkylaluminum:support, not including any solvent or diluent), preferably at a weight ratio of 0.01:1 to 1:20, preferably a weight ratio of 1:1 to of 1:10, preferably from 1:1 to 1:2. The trialkylaluminum compound may be directly combined with the calcined support or may be combined with a solvent or diluent prior to or during combination with the support. Preferred solvents/diluents include, butane, pentane, isopentane, hexane, heptane, octane, nonane, cyclopentane, cyclohexane, benzene, toluene, ethylbenzene, diethylbenzene and the like. If the trialkylaluminum compound is combined with a solvent or diluent it is typically present at about 0.01 to 95 weight %. The combination may then be dried, for example by heating, or exposure to vacuum. If the combination is dried by heating it is typically heated to about 200° C. or less. For ease of reference the combination of the calcined support with the second trialkylaluminum is referred to as the treated support. Typically, after treatment with the second trialkylaluminum, both the first and second trialkylaluminum compounds are present on the support in amounts of 1 to 20 weight %, preferably 2 to 15 weight %, more preferably 3 to 15 weight %.

In a preferred embodiment the treated support has at least 10% more of trialkylaluminum (first and second, if they are different) present than the calcined support prior to treatment with the second trialkylaluminum, preferably at least 25% more, more preferably at least 50% more, more preferably at least 100% more. The amount of trialkylaluminum present on a support is typically measured by Standard ICP (Inductively Coupled Plasma Atomic Emissions Spectroscopy—sometimes called ICP-AES) elemental analysis techniques calibrated against standard samples and using claisse fusion method for sample preparation. The weight percent of the aluminum on the support will vary if the sample is allowed to absorb water, so the sample should be protected against air and water prior to testing.

One way to quantify the amount of trialkylaluminum on the calcined support versus the amount of trialkylaluminum on the treated support is to measure the ratios of aluminum from the trialkylaluminum compounds to an element in the support, (hereafter "support element") such as silica. The aluminum to support element ratio is determined by X-ray Photoelectron Spectroscopy (XPS) normalizing to hydrogen and metals. For example, for a silica support, the aluminum to silicon ratio would be measured by XPS for the calcined support and for the treated support. The ratio of the calcined (Al:Si) to treated (Al:Si) directly correlates to the ratio of aluminum to silicon in the calcined support particles over the aluminum to silicon ratio of the treated support particles mentioned in the preceding paragraph. For example, if the XPS data show that the concentration of silicon is 16.37% and the concentration of aluminum is 8.04% in the first sample that is the calcined silica then the ratio of aluminum to silicon in that sample is 8.04 divided by 16.37 which is 0.491. Then if the XPS for the treated support shows that there is now 15.680% silicon and 10.29% aluminum, the aluminum to silicon ratio in the treated sample is 10.29 divided by 15.68 which is 0.656. The ratio of aluminum on the calcined support to aluminum on the treated support is then determined by dividing 0.491 by 0.656 to come up with a final ratio of 0.749. In particular, the ratio of aluminum to support element on the calcined support to aluminum to support element on the treated support is preferably about 2.0:1 or less, preferably about 1.5:1 or less, even more preferably about 1.0:1.0, even more preferred 0.85:1.0 or less.

For the purposes of this invention the samples should be crushed prior to measurement. The word "crushed" refers to a finely ground solid, such as one that has been ground by mortar and pestle to a fine powder. The sample is "crushed" enough when the XPS measurements do not vary by more than 5%. Similar XPS data can be generated by methods known in the art for support materials other than silica and should be analyzed in the same manner as the silica example above. In the event that non-silicon supports are used, then the element selected for XPS study and comparison as discussed above would be the metal of the group 2, 3, 4 or 5 metal oxide, the silica of the silicates or the carbon of the polyolefin. In the event different supports are combined, the selected elemental ratios should also be combined. In the special case of alumina supports, one could measure the relative amounts of aluminum to carbon, since alumina supports do not contain carbon and the trialkylaluminum compounds do. In that case the relevant ratio would be the ratio of the carbon to aluminum on the calcined support to the ratio of the carbon to aluminum from the treated support.

For ease of reference we have referred to the trialkylaluminum compounds as "first" and "second" herein, however one of ordinary skill will recognize that the "first" trialkylaluminum could be a combination of two or more trialkylaluminum compounds and the "second" could independently be a combination of two or more trialkylaluminum compounds.

The treated support may then be combined with a transition metal catalyst compound to form a polymerization catalyst system. Useful catalyst compounds are described below. Typically an aluminum to transition metal molar ratio of about 12:1 to 500:1 is preferred; more preferably, a ratio of 50:1 to 400:1 is employed. A preferred weight ratio of catalyst compound to support is 0.01:1 to 0.20:1, most preferably 0.05:1 to 0.10:1. Any support method may be used to place the catalyst compound onto the treated support.

For example the catalyst compound may be dissolved in a solvent or suspended in a diluent, combined with the treated support, and then dried. Typically the mixture of the transition metal compound, the solvent/diluent and the treated support may be mixed by hand with a spatula, by a rotating stirrer with wire loops, by metal blades rotating at high speed, by a helical ribbon bladed mixer, by shaking, tumbling, fluidized bed mixing, by paddle or propeller blades on a rotating stir shaft, or other appropriate means. The total amount of diluent/solvent used to form the suspension or solution may be less than the pore volume of the support, or greater than the pore volume of the support such that a slurry is formed, or an amount in between such that a solution-finely divided support mixture is neither free flowing nor a slurry. The catalyst compound solution may be added to support or vice versa as appropriate to the mixing method. If desired the liquids may be removed by purging with an inert gas or under vacuum. In some preferred embodiments, the incipient wetness support technique is used, where the catalyst compound is dissolved in a volume of solvent that is 4 times the pore volume of the support or less, preferably 3 times the pore volume of he support or less, preferably 2 times the pore volume of the support or less, preferably 1 times the pore volume of the support or less. The procedure for measuring the total pore volume of a porous support is well known in the art. Details of one of this procedures can be found in Volume 1, Experimental Methods in Catalytic Research, 67-96 (Academic Press, 1968) and involves the use of a classical BET apparatus for nitrogen absorption.

Support materials useful in this invention may be any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Preferred support materials include inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. Preferred supports for use in this invention include silica, alumina, and silica-aluminates.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 m²/g, pore volume from about 0.8 to about 3.0 cc/g and average particle size is from about 5 to about 100 μm. The average pore size of the carrier useful in the invention typically has pore size in the range of from 10 to 1000 Å, preferably 50 to about 500 Å, and most preferably 75 to about 350 Å.

In a preferred embodiment, two or more catalyst compounds may be supported together on one support, or the catalysts may be independently placed on two supports and subsequently mixed.

In another embodiment the support may comprise one or more types of support material which may be treated differently. For example one could use two different silicas that had different pore volumes or had been calcined at different temperatures. Likewise one could use a silica that had been treated with a particular trialkylaluminum and a silica that had been treated with another trialkylaluminum. Further one could use a silica that had been treated with a large amount of trialkylaluminum and a silica that had been treated a smaller volume of trialkylaluminum.

This invention also relates to a method for preparing an active supported catalyst comprising:
a) removing polar surface groups on a support (the support may be any of those described above) by treatment with an aluminum alkyl (which may be any of those described above) and calcination (as described above);
b) contacting the treated support with further aluminum alkyl (which also may independently be any of those described above); and
c) contacting the aluminum alkyl treated support with a halogen-free transition metal catalyst compound.

A polar surface group is defined to be any heteroatom or heteroatom containing group that contains elements other than carbon, hydrogen and silica and that is present on the surface of a support including the surfaces of pores and crevices. For example, oxygen is the most common polar surface group on silica supports. A halogen free transition metal catalyst compound is any of the catalyst compounds described below where halogen is not present in the compound.) In one embodiment the aluminum alkyl is trimethylaluminum.

In another aspect of this invention in any of the embodiments above the tri alkyl aluminum or alkyl aluminum compound may be tri methylaluminum.

Olefin Polymerization Catalyst System

In the present invention, an olefin polymerization catalyst systems can be prepared by contacting the supports described herein with a catalyst compound (also called catalyst precursor compounds, pre-catalyst compounds or catalyst precursors).

Catalyst Compounds

The treated supports of the invention may be utilized in conjunction with any suitable polymerization catalyst compound or compounds to polymerize unsaturated monomers, including olefin(s). Examples of suitable catalyst compounds include metallocene catalyst compositions, Group 15 atom containing metal polymerization catalyst compositions, and phenoxide transition metal catalyst compositions. The following is a non-limiting discussion of the various polymerization catalyst compounds which may be utilized with the supports of the invention.

Bulky Ligand Metallocene Catalyst Compositions

The supports of the present invention may be used to activate metallocene catalyst compositions. Generally, these catalyst compounds include half and full sandwich compounds having one or more bulky ligands bonded to at least one metal atom. Typical metallocene compounds are described as containing one or more bulky ligand(s) and one or more leaving group(s) bonded to at least one metal atom.

The bulky ligands may be open, acyclic, fused ring(s) or ring system(s), or a combination thereof. The ring(s) or ring system(s) of these bulky ligands are typically composed of atoms selected from Groups 13 to 16 atoms of the Periodic Table of the Elements. Preferably the atoms are selected from the group consisting of carbon, nitrogen, oxygen, silicon, sulfur, phosphorus, germanium, boron and aluminum or a combination thereof. Most preferably the ring(s) or ring system(s) are composed of carbon atoms such as but not limited to those cyclopentadienyl ligands or cyclopentadienyl-type ligand structures. The bulky ligands may also be other similar functioning ligand structure such as pentadiene, a cyclooctatetradienyl or an imide ligand. The metal atom is preferably selected from Group 3 through 15 and the lanthanide or actinide series of the Periodic Table of the Elements. Preferably the metal is a transition metal from Groups 4 through 12, more preferably Groups 4, 5 and 6, and most preferably the transition metal is from Group 4, especially Ti or Zr or Hf.

In one embodiment, the metallocene catalyst compounds, which may be utilized with the supports of the invention, may be represented by Formula IV:

$$L^A L^B M Q_n \qquad \text{(Formula IV)}$$

where M is a metal atom from the Periodic Table of the Elements and may be a Group 3 to 12 metal or from the lanthanide or actinide series of the Periodic Table of the Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine (WO 99/40125), pyrrolyl ligands, pyrazolyl ligands, carbazolyl ligands, borabenzene ligands and the like, including hydrogenated versions thereof, for example tetrahydroindenyl ligands. In another embodiment, $L^A$ and $L^B$ may comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other $L^A$ and $L^B$ bulky ligands include but are not porphyrins, phthalocyanines, corrins and other polyazamacrocycles. Independently, each $L^A$ and $L^B$ may be the same or different type of bulky ligand that is bonded to M. In one embodiment of Formula (IV) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl-or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorus, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In on embodiment, Q is a monoanionic labile ligand having a sigma-bond to M. Depending on the oxidation state of the metal, the value for n is 0, 1, or 2 or such that Formula (IV) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the supports of the invention are utilized with the metallocene catalyst compounds of Formula (V) where $L^A$ and $L^B$ are bridged to each other by at least one bridging group, A, as represented in Formula V:

$$L^A A L^B M Q_n \qquad \text{Formula V)}$$

These bridged compounds are known as bridged, metallocene catalyst compounds. $L^A$, $L^B$, M, Q and n are defined above. Non-limiting examples of bridging group A include bridging groups containing at least one Group 13 to 16 atom, often referred to as divalent moiety such as but not limited to as least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group may also contain substituent groups R as defined above including halogens and iron. Non-limiting examples of bridging group A may be represented by $R'_2C$, $R'_2Si$, $R'_2SiR'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula (V) have two or more bridging groups A (EP 664 301 B1).

In another embodiment, the supports of the invention may be utilized with metallocene catalyst compounds where the R substituents on the bulky ligands $L^A$ and $L^B$ of Formulas (IV) and (V) are substituted with the same or different number of substituents on each of the bulky ligands. In another embodiment, the bulky ligands $L^A$ and $L^B$ of formulas (IV) and (V) are different from each other.

In another embodiment, the supports of the invention may be utilized with other metallocene catalyst compounds such as those described in U.S. Pat. Nos. 5,064,802, 5,145,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are fully incorporated herein by reference.

In another embodiment, the supports of the invention may be utilized with metallocene catalysts which include bridged heteroatom, mono-bulky ligand metallocene compounds. These types of catalysts and catalyst systems are described in, for example, PCT publication WO 92/00333, WO 94/07928, WO 91/04257, WO 94/03506, WO 96/00244, WO 97/15602 and WO 99/20637 and U.S. Pat. Nos. 5,057, 475, 5,096,867, 5,055,438, 5,198,401, 5,227,440, and 5,264, 405 and European publication EP-A-0 420 436, all of which are herein fully incorporated by reference.

In this embodiment, the supports of the invention are utilized with a metallocene catalyst compound represented by Formula VI:

$$L^c A J M Q_n \qquad \text{Formula VI)}$$

where M is a Group 3 to 12 metal atom or a metal selected from the Group of actinides and lanthanides of the Periodic Table of the Elements, preferably M is a Group 4 to 12 transition metal, and more preferably M is a Group 4, 5 or 6 transition metal, and most preferably M is Group 4 transition metal in any oxidation state, especially Ti or Zr or Hf, $L^c$ is a substituted or unsubstituted bulky ligand bonded to M; J is bonded to M; A is bonded to L$^c$ and J; J is a heteroatom ancillary ligand; and A is a bridging group; Q is a univalent anionic ligand; and n is the integer 0, 1 or 2. In Formula (VI) above, L$^c$, A and J form a fused ring system. In an embodiment, L$^c$ of formula (VI) is as defined above for L$^A$, A, M and Q of formula (VI) are as defined above in formula (V).

In Formula (VI) J is a heteroatom containing ligand in which J is an element with a coordination number of three from Group 15 or an element with a coordination number of two from Group 16 of the periodic Table of the Elements. Preferably J contains a nitrogen, phosphorus, oxygen or sulfur atom with nitrogen being most preferred.

In another embodiment, the supports of the invention are utilized with a metallocene catalyst compound which is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment the supports of the invention are utilized with a metallocene catalyst compound, which may be represented by Formula (VII):

L$^D$MQ$_2$(YZ)X$_n$     Formula (VII)

Where M is a Group 3 to 16 metal, preferably a Group 4 to 12 transition metal, and most preferably a Group 4, 5 or 6 transition metal; L$^D$ is a bulky ligand that is bonded to M; each Q is independently bonded to M and Q$_2$(YZ) forms a unicharged polydentate ligand; Q is a univalent anionic ligand also bonded to M; X is a univalent anionic group when n is 2 or X is a divalent anionic group when n is 1; n is 1 or 2.

In Formula (VII), L$^D$ is defined to be the same as L$^A$ above and M are as defined above for Formula (IV). Q is as defined above for Formula (IV), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$ and —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment, the supports of the invention are utilized with metallocene catalyst compounds, which include heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorus and tin. Examples of these metallocene catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258 all of which are herein incorporated by reference.

In another embodiment, the supports of the invention may be utilized with metallocene catalyst compounds, which include complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the metallocene catalyst compounds are those described in PCT publications WO 99/01481 and WO 98/42664, which are fully incorporated herein by reference.

In another embodiment, the supports of the invention may be utilized with metallocene catalyst compounds which may be represented by Formula (VII):

((Z)XA$_t$(YJ))$_q$MQ$_n$     Formula (VIII)

where M is selected from Group 3 to 13 or lanthanide and actinide series of the Periodic Table of the Elements; Q is bonded to M and each Q is monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y and J, preferably X and J; q is 1 or 2; n is 1, 2 3, or 4 depending on the oxidation state of M. In one embodiment, where X is oxygen or sulfur then Z is optional. In another embodiment, where X is nitrogen or phosphorus then Z is present. In one embodiment, Z is preferably an aryl group, more preferably a substituted aryl group.

The metallocene catalyst compounds useful in this invention may, in one embodiment, include complexes of Ni$^{2+}$ and Pd$^{2+}$ described in the articles Johnson, et al., New Pd(II)— and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663, and 5,880,241, which are all herein fully incorporated by reference. These complexes can be either dialkyl ether adducts, or alkylated reaction products of the described dihalide complexes that can be activated to a cationic state by the activators of this invention described below.

Also included as metallocene catalysts are those diimine based ligands of Group 8 to 10 metal compounds disclosed in PCT publications WO 96/23010 and WO 97/48735 and Gibson, et al., Chem. Comm., pp. 849-850 (1998), all of which are herein incorporated by reference.

Other metallocene catalysts, which may be utilized with the supports of the invention, are those Group 5 and 6 metal imido complexes described in EP-A2-0 816 384 and U.S. Pat. No. 5,851,945, which is incorporated herein by reference. Also useful with the supports of this invention are bridged bis(amido) catalyst compounds as described in WO 96/27439 and D. H. McConville, et al., in Organometallics 1995, 14, 5478-5480, which is herein incorporated by reference. Other metallocene catalysts that may be used with the supports of this invention are described as bis(hydroxy aromatic nitrogen ligands) in U.S. Pat. No. 5,852,146 which is incorporated herein by reference. Other metallocene catalysts containing one or more Group 15 atoms that may be used with the supports of this invention include those described in WO 98/46651, which is herein incorporated by reference. Still other metallocene catalysts that can be used with the supports of this invention include those multi-nuclear metallocene catalysts as described in WO 99/20665, which is incorporated herein by reference.

It is also contemplated that in one embodiment, the metallocene catalysts described above include their structural or optical or enantiomeric isomers (meso and racemic isomers, for example see U.S. Pat. No. 5,852,143, incorporated herein by reference) and mixtures thereof.

Group 15 Atom Containing Polymerization Catalysts

The supports of the invention may also be utilized with Group 15 atom containing polymerization catalyst compounds. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 and 16 atom through another group.

Preferably, at least one of the Group 15 atoms is also bound to a Group 15 or 16 atom through another group which may be a C1 to C20 hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

Group 15 atom containing metal polymerization catalyst compounds may be represented by Formula (IX) or (X):

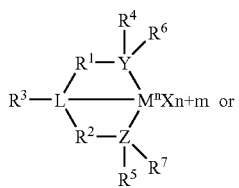

Formula (IX)

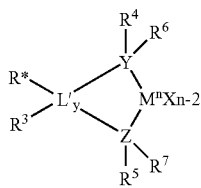

Formula (X)

wherein M is a transition metal, preferably a Group 3 to 14 main group metal, preferably a Group 4, 5, or 6 metal, and more preferably a Group 4 metal, and most preferably zirconium, titanium or hafnium, Each X is independently a leaving group, preferably an anionic leaving group, and more preferably hydrogen, a hydrocarbyl group, a heteroatom, or a halogen, and most preferably an alkyl or an aryl substituted alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent, a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen.

$R^4$ and $R^5$ are independently an alkyl group, an aryl group, substituted aryl group, a cyclic alkyl group, a substituted cyclic alkyl group, a cyclic aralkyl group, a substituted cyclic aralkyl group or a multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, heteroatom containing group.

By "formal charge of the YZL or YZL' ligand", it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

Phenoxide Transition Metal Catalyst Compositions

The supports of the invention may also be used with phenoxide transition metal catalyst compounds. Generally, these complexes are heteroatom substituted phenoxide ligated Group 3 to 10 transition metal or lanthanide metal compounds wherein the metal is bound to the oxygen of the phenoxide group.

Phenoxide transition metal catalyst compounds may be represented by Formula XI or XII:

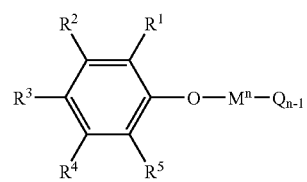

Formula (XI)

Formula (XII)

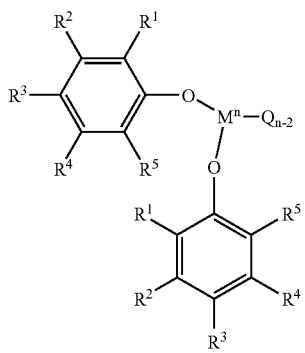

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M; At least one of $R^2$ to $R^5$ is a heteroatom containing group, the rest of $R^2$ to $R^5$ are independently hydrogen or a $C_1$ to $C_{100}$ group, preferably a $C_4$ to $C_{20}$ alkyl group, preferred examples of which include butyl, isobutyl, t-butyl, pentyl, hexyl, heptyl, isohexyl, octyl, isooctyl, decyl, nonyl, dodecyl, and any of $R^2$ to $R^5$ also may or may not be bound to M;

Each $R^1$ to $R^5$ group may be independently substituted or unsubstituted with other atoms, including heteroatoms or heteroatom containing group(s):

O is oxygen;

M is a Group 3 to Group 10 transition metal or lanthanide metal, preferably a Group 4 metal, preferably M is Ti, Zr or Hf;

n is the valence state of the metal M, preferably 2, 3, 4, or 5; and

Q is, and each Q may be independently be, an alkyl, halogen, benzyl, amid, carboxylate, carbamate, thiolate, hydride or alkoxide group, or a bond to an R group containing a heteroatom which may be any or $R^1$ to $R^5$.

A heteroatom-containing group may be any heteroatom or a heteroatom bound to carbon, silicon or another heteroatom. Preferred heteroatoms include boron, aluminum, silicon, nitrogen, phosphorus, arsenic, tin, lead, antimony, oxygen, selenium, and tellurium. Particularly preferred heteroatoms include nitrogen, oxygen, phosphorus, and sulfur. Even more particularly preferred heteroatoms include nitrogen and oxygen. The heteroatom itself may be directly bound to the phenoxide ring or it may be bound to another atom or atoms that are bound to the phenoxide ring. The heteroatom-containing group may contain one or more of the same or different heteroatoms. Preferred heteroatom containing groups include imines, amines, oxides, phosphines, ethers, ketones, heterocyclics, oxazolines, thioethers, and the like. Particularly preferred heteroatom containing groups include imines. Any two adjacent R groups may form multi-ring structures. In one embodiment any two or more R groups do not form a 5 membered ring.

In a preferred embodiment the heteroatom substituted phenoxide transition metal compound is an iminophenoxide Group 4 transition metal compound, and more preferably and iminophenoxidezirconium compound.

Preferred metallocene catalyst compounds include:
rac-dimethylsilyl-bis(indenyl)hafniumdimethyl,
rac-dimethylsilyl-bis(indenyl)hafniumdichloride,
rac-dimethylsilyl-bis(indenyl)zirconiumdimethyl,
rac-dimethylsilyl-bis(indenyl)zirconiumdichloride,
rac-dimethylsilyl-bis(2-methyl-4-phenyl-indenyl)hafniumdimethyl,
rac-dimethylsilyl-bis(2-methyl-4-phenyl-indenyl)hafniumdichloride,
rac-dimethylsilyl-bis(2-methyl-4-phenyl-indenyl)zirconiumdimethyl,
rac-dimethylsilyl-bis(2-methyl-4-phenyl-indenyl)zirconiumdichloride,
rac-dimethylsilyl-bis(2-methyl-benzindenyl)hafniumdimethyl,
rac-dimethylsilyl-bis(2-methyl-benzindenyl)hafniumdichloride,
rac-dimethylsilyl-bis(2-methyl-benzindenyl)zirconiumdimethyl,
rac-dimethylsilyl-bis(2-methyl-benzindenyl)zirconiumdichloride,
rac-dimethylsilyl-bis-(2-methyl-indenyl)zirconiumdimethyl,
rac-dimethylsilyl-bis-(2-methyl-indenyl)hafniumdimethyl,
rac-dimethylsilyl-bis-(2-methyl-indenyl)hafniumdichloride,
rac-dimethylsilyl-bis-(2-methyl-indenyl)zirconiumdichloride,
rac-dimethylsilyl-bis(2-methyl-4-naphthyl-indenyl)hafniumdimethyl,
rac-dimethylsilyl-bis(2-methyl-4-naphthyl-indenyl)zirconiumdichloride,
rac-dimethylsilyl-bis(2-methyl-4-naphthyl-indenyl)hafniumdichloride,
rac-dimethylsilyl-bis(2-methyl-4-naphthyl-indenyl)zirconiumdimethyl,
rac-ethylene-bis(indenyl)hafniumdimethyl,
rac-ethylene-bis(indenyl)hafniumdichloride,
rac-ethylene-bis(indenyl)zirconiumdimethyl,
rac-ethylene-bis(indenyl)zirconiumdichloride,
rac-dimethylsilyl-bis(2-methyl-4-(2'-methyl-phenyl)-indenyl)hafniumdimethyl,
rac-dimethylsilyl-bis(2-methyl-4-(2'-methyl-phenyl)-indenyl)hafniumdichloride,
rac-dimethylsilyl-bis(2-methyl-4-(2'-methyl-phenyl)-indenyl)zirconiumdimethyl,
rac-dimethylsilyl-bis(2-methyl-4-(2'-methyl-phenyl)-indenyl)zirconiumdichloride,
rac-dimethylsilyl-bis(2-methyl-4-(4'-methyl-phenyl)-indenyl)hafniumdimethyl,
rac-dimethylsilyl-bis(2-methyl-4-(4'-methyl-phenyl)-indenyl)hafniumdichloride,
rac-dimethylsilyl-bis(2-methyl-4-(4'-methyl-phenyl)-indenyl)zirconiumdimethyl,
rac-dimethylsilyl-bis(2-methyl-4-(4'-methyl-phenyl)-indenyl)zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl)zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl, rac-dimethylsilyl-bis(2-methyl-4-(4'-tert-butyl-phenyl)-indenyl)zirconiumdichloride,
rac-dimethylsilyl-(2-methyl-4-(4'-tert-butyl-phenyl)-indenyl)(2-isoprpyl-4-(4'-tert-butyl-phenyl)-indenyl)hafniumdimethyl,
rac-dimethylsilyl-(2-methyl-4-(4'-tert-butyl-phenyl)-indenyl)(2-isoprpyl-4-(4'-tert-butyl-phenyl)-indenyl)hafniumdichloride,
rac-dimethylsilyl-(2-methyl-4-(4'-tert-butyl-phenyl)-indenyl)(2-isoprpyl-4-(4'-tert-butyl-phenyl)-indenyl)zirconiumdichloride,
rac-dimethylsilyl-(2-methyl-4-(4'-tert-butyl-phenyl)-indenyl)(2-isoprpyl-4-(4'-tert-butyl-phenyl)-indenyl)zirconiumdimethyl,
rac-dimethylsilyl-bis(2-methyl-4,6-diisopropyl-indenyl)hafniumdimethyl,
rac-dimethylsilyl-bis(2-methyl-4,6-diisopropyl-indenyl)zirconiumdimethyl,
rac-dimethylsilyl-bis(2-methyl-4,6-diisopropyl-indenyl)zirconiumdichloride,
rac-dimethylsilyl-bis(2-methyl-4,6-diisopropyl-indenyl)hafniumdichloride,
Bis(cyclopentadieneyl)zirconiumdichloride,
Bis(cyclopentadienyl)zirconiumdimethyl,
Bis(pentamethylcyclopentadieneyl)zirconiumdichloride,
Bis(pentamethylcyclopentadienyl)zirconiumdimethyl,
Bis(cyclopentadieneyl)(pentamethylcyclopentadienyl)zirconiumdichloride,
Bis(cyclopentadienyl)(pentamethylcyclopentadienyl)zirconiumdimethyl,
Bis(1-methyl,4-butylcyclopentadienyl)zirconiumdichloride,
Bis(1-methyl,4-butylcyclopentadienyl)zirconiumdimethyl,
Bis(1-methyl,4-butylcyclopentadienyl)zirconiumdimethoxide,
Bis(1-methyl,4-butylcyclopentadienyl)zirconiumdibenzyl,
Bis(1-methyl,4-butylcyclopentadienyl)zirconiumdifluoride,
Bis(1-methyl,4-butylcyclopentadienyl)zirconiumdiamide,
Bis(1-methyl,4-ethylcyclopentadienyl)zirconiumdichloride,
Bis(1-methyl,4-ethylcyclopentadienyl)zirconiumdimethyl,
Bis(1-methyl,4-benzylcyclopentadienyl)zirconiumdichloride,
Bis(1-methyl,4-benzylcyclopentadienyl)zirconiumdimethyl,
Bis(1-methyl,3-butylcyclopentadienyl)zirconiumdichloride,
Bis(1-methyl,3-butylcyclopentadienyl)zirconiumdimethyl,
Bis(1-methyl,3-n-propylcyclopentadienyl)zirconiumdichloride,
Bis(1-methyl,3-n-propylcyclopentadienyl)zirconiumdimethyl,
Bis(1-methyl,3-iso-propylcyclopentadienyl)zirconiumdichloride,
Bis(1-methyl,3-iso-propylcyclopentadienyl)zirconiumdimethyl,
Bis(1,3-dimethylcyclopentadienyl)zirconiumdichloride,
Bis(1,3-dimethylcyclopentadienyl)zirconiumdimethyl,
Bis(n-propylcyclopentadienyl)zirconiumdichloride,
Bis(n-propylcyclopentadienyl)zirconiumdimethyl,
Bis(n-propylcyclopentadienyl)zirconiumdifluoride,
Bis(n-propylcyclopentadienyl)zirconiumdiamide,
Bis(n-propylcyclopentadienyl)zirconiumdibenzyl,
Bis(n-propylcyclopentadienyl)zirconiumdimethoxide,
Bis(n-propylcyclopentadienyl)hafniumdichloride,
Bis(n-propylcyclopentadienyl)hafniumdimethyl,
Bis(n-propylcyclopentadienyl)hafniumdifluoride,
Bis(n-propylcyclopentadienyl)hafniumdiamide,
Bis(n-propylcyclopentadienyl)hafniumdibenzyl,
Bis(n-propylcyclopentadienyl)hafniumdimethoxide,
Bis(n-butylcyclopentadienyl)zirconiumdichloride,
Bis(n-butylcyclopentadienyl)zirconiumdimethyl,
Bis(tert-butylcyclopentadienyl)zirconiumdichloride,
Bis(tert-butylcyclopentadienyl)zirconiumdimethyl,
Bis(benzylcyclopentadienyl)zirconiumdichloride,
Bis(benzylcyclopentadienyl)zirconiumdimethyl,
Bis(benzylcyclopentadienyl)(pentamethylcyclopentadienyl)zirconiumdimethyl,
Bis(benzylcyclopentadienyl)(pentamethylcyclopentadienyl)zirconiumdichloride,
Bis(propylcyclopentadienyl)(pentamethylcyclopentadienyl)zirconiumdimethyl,
Bis(propylcyclopentadienyl)(pentamethylcyclopentadienyl)zirconiumdichloride,
Bis(propylcyclopentadienyl)(tetramethylcyclopentadienyl)zirconiumdimethyl,
Bis(propylcyclopentadienyl)(tetramethylcyclopentadienyl)zirconiumdichloride,
Bis(tetramethyl,propylcyclopentadienyl)(pentamethylcyclopentadienyl)zirconiumdimethyl,
Bis(tetramethyl,propylcyclopentadienyl)(pentamethylcyclopentadienyl)zirconiumdichloride,
Bis(tetramethyl,propylcyclopentadienyl)(cyclopentadienyl)zirconiumdimethyl,
Bis(tetramethyl,propylcyclopentadienyl)(cyclopentadienyl)zirconiumdichloride,
Dimethylsilylbis(cyclopentadienyl)zirconiumdichloride,
Dimethylsilylbis(cyclopentadienyl)zirconiumdimethyl,
Dimethylsilylbis(cyclopentadienyl)zirconiumdimethoxide,
Dimethylsilylbis(cyclopentadienyl)zirconiumdiamide,
Dimethylsilylbis(cyclopentadienyl)zirconiumdifluoride,
Dimethylsilylbis(cyclopentadienyl)zirconiumdiiodide,
Dimethylsilylbis(cyclopentadienyl)zirconiumdibromide,
Dimethylsilylbis(pentamethylcyclopentadienyl)zirconiumdichloride,
Dimethylsilylbis(pentamethylcyclopentadienyl)zirconiumdimethyl,
Dimethylsilylbis(pentamethylcyclopentadienyl)zirconiumdifluoride,
Dimethylsilylbis(pentamethylcyclopentadienyl)zirconiumdimethoxide,
Dimethylsilylbis(pentamethylcyclopentadienyl)zirconiumdiamide,
Dimethylsilylbis(pentamethylcyclopentadienyl)zirconiumdibromide,
Dimethylsilylbis(pentamethylcyclopentadienyl)zirconiumdibenzyl,
Dimethylsilylbis(cyclopentadienyl)(pentamethylcyclopentadienyl)zirconiumdichloride,
Dimethylsilylbis(cyclopentadienyl)(pentamethylcyclopentadienyl)zirconiumdimethyl,
Dimethylsilylbis(cyclopentadienyl)(pentamethylcyclopentadienyl)zirconiumdimethoxide,
Dimethylsilylbis(cyclopentadienyl)(pentamethylcyclopentadienyl)zirconiumdibromide,
Dimethylsilylbis(cyclopentadienyl)(pentamethylcyclopentadienyl)zirconiumdiamide,
Dimethylsilylbis(cyclopentadienyl)(pentamethylcyclopentadienyl)zirconiumdifluoride,
Dimethylsilylbis(cyclopentadienyl)(pentamethylcyclopentadienyl)zirconiumdibenzyl,
Dimethylsilylbis(1-methyl,4-butylcyclopentadienyl)zirconiumdichloride,
Dimethylsilylbis(1-methyl,4-butylcyclopentadienyl)zirconiumdimethyl,
Dimethylsilylbis(1-methyl,4-butylcyclopentadienyl)zirconiumdimethoxide, Dimethylsilylbis(1-methyl,4-butylcyclopentadienyl)zirconiumdibromide,
Dimethylsilylbis(1-methyl,4-butylcyclopentadienyl)zirconiumdi fluoride,
Dimethylsilylbis(1-methyl,4-butylcyclopentadienyl)zirconiumdiamide,
Dimethylsilylbis(1-methyl,4-butylcyclopentadienyl)zirconiumdimethoxide,
Dimethylsilylbis(1-methyl,4-butylcyclopentadienyl)zirconiumdibenzyl,
Dimethylsilylbis(1-methyl,4-ethylcyclopentadienyl)zirconiumdichloride,
Dimethylsilylbis(1-methyl,4-ethylcyclopentadienyl)zirconiumdimethyl,
Dimethylsilylbis(1-methyl,4-benzylcyclopentadienyl)zirconiumdichloride,
Dimethylsilylbis(1-methyl,4-benzylcyclopentadienyl)zirconiumdimethyl,
Dimethylsilylbis(1-methyl,3-butylcyclopentadienyl)zirconiumdichloride,
Dimethylsilylbis(1-methyl,3-butylcyclopentadienyl)zirconiumdimethyl,
Dimethylsilylbis(1-methyl,3-n-propylcyclopentadienyl)zirconiumdichloride,
Dimethylsilylbis(1-methyl,3-n-propylcyclopentadienyl)zirconiumdimethyl,
Dimethylsilylbis(1-methyl,3-iso-propylcyclopentadienyl)zirconiumdichloride,
Dimethylsilylbis(1-methyl,3-iso-propylcyclopentadienyl)zirconiumdimethyl,
Dimethylsilylbis(1,3-dimethylcyclopentadienyl)zirconiumdichloride,
Dimethylsilylbis(1,3-dimethylcyclopentadienyl)zirconiumdimethyl,
Dimethylsilylbis(n-propylcyclopentadienyl)zirconiumdichloride,
Dimethylsilylbis(n-propylcyclopentadienyl)zirconiumdimethyl,
Dimethylsilylbis(n-butylcyclopentadienyl)zirconiumdichloride,
Dimethylsilylbis(n-butylcyclopentadienyl)zirconiumdimethyl,
Dimethylsilylbis(tert-butylcyclopentadienyl)zirconiumdichloride,
Dimethylsilylbis(tert-butylcyclopentadienyl)zirconiumdimethyl,
Dimethylsilylbis(benzylcyclopentadienyl)zirconiumdichloride,
Dimethylsilylbis(benzylcyclopentadienyl)zirconiumdimethyl,
Dimethylsilylbis(benzylcyclopentadienyl)(pentamethylcyclopentadienyl)zirconiumdimethyl,
Dimethylsilylbis(benzylcyclopentadienyl)(pentamethylcyclopentadienyl)zirconiumdichloride,
Dimethylsilylbis(propylcyclopentadienyl)(pentamethylcyclopentadienyl)zirconiumdimethyl,
Dimethylsilylbis(propylcyclopentadienyl)(pentamethylcyclopentadienyl)zirconiumdichloride,
Dimethylsilylbis(propylcyclopentadienyl)(tetramethylcyclopentadienyl)zirconiumdimethyl,
Dimethylsilylbis(propylcyclopentadienyl)(tetramethylcyclopentadienyl)zirconiumdichloride,
Dimethylsilylbis(tetramethyl,propylcyclopentadienyl)(pentamethylcyclopentadienyl)zirconiumdimethyl,
Dimethylsilylbis(tetramethyl,propylcyclopentadienyl)(pentamethylcyclopentadienyl)zirconiumdichloride,
Dimethylsilylbis(tetramethyl,propylcyclopentadienyl)(cyclopentadienyl)zirconiumdimethyl, and
Dimethylsilylbis(tetramethyl,propylcyclopentadienyl)(cyclopentadienyl)zirconiumdichloride.

Activators

While additional activators are not required, they may be present if desired. Preferably the additional activators are not present, but if they are present they may be present in any amount typically used for olefin polymerization. Preferably additional activators are present on the support at catalyst transition metal to activator metal ratios of 1:1 to 1:10,000. Useful additional activators include methylalumoxane and those listed in WO 2004/026921 at paragraph [0135] on page 77-78.

Polymerization Process

The supports of the invention and catalyst systems utilizing the supports described above are suitable for use in any prepolymerization and/or polymerization process over a wide range of temperatures and pressures. The temperatures may be in the range of from −60° C. to about 280° C., preferably from 50° C. to about 200° C. In another embodiment the polymerization temperature is above 0° C., above 50° C., above 80° C., above 100° C., above 150° C. or above 200° C. In one embodiment the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C. I another embodiment, the reactor temperature in a gas phase process is above 60° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200, EP-B1-0 649 992, EP-A-0 802 202 and EP-B-0 634 421 all of which are herein fully incorporated by reference.

In another embodiment, the reactor utilizing the present invention is capable of producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In another embodiment, the slurry process temperature is above 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In another embodiment, the polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment the reactor used in the slurry process of the invention is capable of producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998, and 5,589,555 and PCT WO 99/32525, which are fully incorporated herein by reference.

In one embodiment of the process of the invention is the process, preferably a slurry or gas phase process operated in the presence of the catalyst system of the invention and in the absence of or essentially free of any scavengers, such as triethylaluminum, trimethylaluminum, tri-isobutylaluminum, and tri-n-hexylaluminum and diethylaluminum chloride, dibutyl zinc and the like. This process is described in PCT publication WO 96/08520 and U.S. Pat. No. 5,712,352 and 5,763,543, which are herein fully incorporated by reference.

In another embodiment, the method of the invention provides for injecting the catalyst system of the invention into a reactor, particularly a gas phase reactor. The polymerization catalyst in liquid form can be fed with an activator, and/or a support, and/or a supports together or separately to a reactor. The injection methods described in PCT publication WO 97/46599, which are fully incorporated herein by reference, may be utilized.

In embodiments of the process of this invention, the catalyst system may be employed in liquid phase (slurry, suspension, bulk phase or combinations thereof), in high pressure liquid, or supercritical fluid or gas phase processes. Each of these processes may be employed in single, parallel or series reactors. The liquid processes comprise contacting the monomers with the supported catalyst system described herein in a suitable diluent or solvent and allowing the monomers to react for a sufficient time to produce embodiments of the invention copolymers. One or more of the monomers used in the polymerization may be utilized as a solvent and/or diluent. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use a supported catalyst and may be conducted in any manner known to be suitable for producing ethylene homopolymers or copolymers via coordination polymerization. Illustrative examples may be found in U.S. Pat. Nos. 4,543,399, 4,588,790, 5,028,670, 5,382,638, 5352,749, 5,436,304, 5,453,471, 5,463,999, and WO 95/07942. Each is incorporated by reference for purposes of U.S. patent practice.

Generally, the polymerization reaction temperature may vary from −50° C. to 250° C. The reaction temperature conditions may be from −20° C. to 220°, or below 200° C. The pressure may vary from 1 mm Hg to 2500 bar, or from 0.1 bar to 1600 bar, or from 1.0 to 500 bar. Where lower molecular weight copolymers, e.g., $M_n \leq 10,000$, are sought, it may be suitable to conduct the reaction processes at temperatures above 0° C. and pressures under 500 bar.

Polymer Products

The polymers produced by the process of the invention can be used in a wide variety of products and end-use applications. The polymers produced can be homo-and co-polymers of ethylene and or propylene and include linear low density polyethylene, elastomers, plastomers, high-density polyethylenes, medium density polyethylenes, low density polyethylenes, polypropylene and polypropylene copolymers. Preferred polymers, typically ethylene based copolymers, have a density of from 0.86 g/cc to 0.97 g/cc; density being measured in accordance with ASTM-D-1238. The term "copolymer", as used herein, may mean a polymer derived from 2 or more monomeric types. Preferred monomers and co-monomers include ethylene, propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene, vinylcyclohexane, 1,4-hexadiene, dicyclopentadiene, 5-ethylidene-2-norbornene, vinylcyclohexene, 5-vinyl-2-norbornene, or combinations thereof Propylene based polymers produced include isotactic polypropylene, atactic polypropylene and random, block or impact copolymers.

The polymers of embodiments of the invention may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. Additionally, copolymer of embodiments of the invention will comprise a molecular weight distribution (MWD) in the range of $\geq 1$, or $\geq 1.5$ or $\leq 6$, or $\leq 4$ or $\leq 3$.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film, and oriented films.

In a particularly preferred embodiment this invention also provides polymers with a lower or wider dispersion of residual metal ash in the polymer. Ash is generally measured by ICPES (Inductively Coupled Plasma Emission Spectroscopy, which is described in "J. W. Olesik, "Inductively Coupled Plasma-Optical Emission Spectroscopy," in Encyclopedia of Materials Characterization, C. R. Brundle, C. A. Evans, Jr. and S. Wilson, eds., Butterworth-Heinemann, Boston, Mass. (1992) pp. 633-644). The polymers of this invention preferably have an ash content of less than 100 ppm, preferably less than 50 ppm.

EXAMPLES

Experimental

Toluene was purchased from Aldrich and dried overnight over a sodium potassium alloy. $(1,3-MeBuCp)_2ZrMe_2$, 20 wt % solution in toluene was purchased from Norquay Single-Site Catalysts and used as received. Grace Davison 948 silica was obtained from Grace Davison.

Synthesis of Supported Catalyst.

Triethylaluminum-treated silica. 40 grams of raw Grace-Davison 948 silica was combined with 20 grams of triethylaluminum in 250 mls of toluene at room temperature. The reaction was exothermic. After letting the reaction cool to room temperature overnight. The slurry was filtered, rinsed with several 50 ml portions of toluene, and dried under vacuum.

Catalyst 1. Triethylaluminum-treated silica (3.0 grams, Grace-Davison 948 raw silica titrated with triethylaluminum) was exposed to air overnight. The resulting support was calcined under an air stream at 540° C. for approximately 48 hours. The resulting silica support was subsequently placed under nitrogen and cooled to room temperature. A 1.0 gram sample of the silica support was reacted with 0.2 grams of triethylaluminum in a toluene (30 mls) slurry. The slurry was allowed to sit overnight. The slurry was then filtered under partial vacuum, washed with several 10 ml portions of toluene and combined with 0.30 mgs of $(1,3-MeBuCp)_2ZrMe_2$ in approximately 30 mls of toluene. The slurry was allowed to stand overnight at room temperature. The slurry was filtered through a frit under partial vacuum, rinsed with several 10 ml portions of toluene and dried under vacuum yielding a free flowing powder.

Catalyst 2. The above synthesis was repeated. Catalyst 2 was prepared several weeks after catalyst 1 and thus were of different ages prior to the polymerization runs.

Catalyst 3 (Comparative). A 1.0 gram sample of the triethylaluminum-treated silica that was calcined as according to the synthesis in Catalyst 1 was combined with 0.30 mgs of $(1,3-MeBuCp)_2ZrMe_2$ in approximately 30 mls of toluene. The resulting slurry was allowed to sit overnight at room temperature; subsequently filtered, rinsed with several 10 ml portions of toluene and dried under vacuum.

Catalyst 4 (Comparative). A 1.0 gram sample of triethylaluminum treated silica described above was combined with 0.30 mgs of $(1,3-MeBuCp)_2ZrMe_2$ in approximately 30 mls of toluene. The resulting slurry was allowed to sit overnight at room temperature; subsequently filtered, rinsed with several 10 ml portions of toluene and dried under vacuum.

Experimental

Polymerizations

In the following slurry phase experiments, pressure is reported in atmospheres and pounds per square inch. The conversion factors to S.I. Units are; 1 psi equals 6.894757 kPa and 1 atm equals 101.325 kPa.

Feed and Co-Monomer

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. 98+% 1-hexene was obtained from Alfa-Aesar and further purified by filtration through basic alumina (Aldrich Chemical Company, Brockman Basic 1) into a vessel containing activated 3 A molecular sieve.

Scavengers/Co-Catalysts

Triethylaluminum (TEAL) was obtained from Akzo Chemicals, Inc. and used without further purification. Tri n-octyl aluminum (TNOAL) was obtained from Akzo Chemicals, Inc. and used without further purification.

Polymerization grade hexane was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-Hexene Copolymerization

The reactor was prepared as described above, and then purged with ethylene. The reactors were heated to 40° C. and ethylene was first charged to the reactor. In the cases were hydrogen was employed, hydrogen was added next.

A solution of 1-hexene and scavenger/co-catalyst at room temperature and pressure was next added to the reactors via syringe. The reactors were then brought to process temperature (85° C.) while stirring at 400 rpm. Once at process temperature, ethylene delivery pressure for polymerization was set to the pressure generated by the components (ethylene, diluent, co-monomer, scavenger/co-catalyst) in the reactor.

The supported catalysts were stirred in toluene at ambient temperature and pressure and added to the reactors (at process temperature and pressure) via syringe as a slurry to initiate polymerization.

In the nature that solutions are added via syringe, a hexanes solution was also injected via the same syringe following their addition to insure that minimal solution was remaining in the syringe. This procedure was applied after the addition of the 1-hexene/scavenger/co-catalyst solution as well as the catalyst slurry.

Ethylene was allowed to enter (through the use of computer controlled solenoid valves) the autoclaves during polymerization to maintain reactor gauge pressure (±2 psig). Reactor temperature was monitored and typically maintained within ±1° C. Polymerizations were halted by addition of approximately 400 psig $O_2$/Ar (5 mole % $O_2$) gas mixture to the autoclaves for approximately 30 seconds. The polymerizations were quenched after a predetermined cumulative amount of ethylene had been added or for a maximum of 45 minutes polymerization time. The reactors were cooled and vented. The polymer was isolated after the remaining reaction components were removed in-vacuo. Yields reported include total weight of polymer and residual catalyst. Yields are listed in Table 1.

Polymer Characterization:

Polymer characterization results for polyethylene samples are reported in Table 1. For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165 C in a shaker oven for approximately 3 hours. The typical final concentration of polymer in solution was between 0.4 to 0.9 mg/mL with a BHT concentration of 1.25 mg BHT/mL of TCB. Samples were cooled to 135° C. for testing.

Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples were run in TCB at (135 C sample temperatures, 165° C. oven/columns) using three Polymer Laboratories: PLgel 10 m Mixed-B 300×7.5 mm columns in series. No column spreading corrections were employed. Numerical analyses were performed using Epoch® software available from Symyx Technologies.

Samples for infrared analysis were prepared by depositing the stabilized polymer solution onto a silanized wafer. By this method, approximately between 0.12 and 0.24 mg of polymer was deposited on the wafer cell. The samples were subsequently analyzed on a Brucker Equinox 55 FTIR spectrometer equipped with Pikes's MappIR specular reflectance sample accessory. Spectra, covering a spectral range of 5000 cm-1 to 500 cm-1, were collected at a 2 cm-1 resolution with 32 scans.

For ethylene-1-hexene copolymers the wt. % copmonomer was determined via measurement of the methyl deformation band at ~1378 cm-1. The peak height of this band is normalized by the combination at ~4321 cm-1, which corrects for path length differences. The normalized peak height is correlated to individual calibration curves from $^1$H NMR data to predict the wt. % comonomer content within a concentration range of either approximately 2.4 wt % to approximately 17 wt % or approximately 2.4 wt % to approximately 23.2 wt % for hexene. Typically, $R^2$ correlations of 0.98 or greater are achieved. These numbers are reported as weight % in Table 1.

TABLE 1

Polymerization Data.

| Catalyst | Hexene Incorporation (Weight %) | Mw | Mn | Mw/Mn | Yield Polymer (grams) |
| --- | --- | --- | --- | --- | --- |
| Catalyst 1 | 3.0 | 609,000 | 420,000 | 1.45 | 0.0250 |
| Catalyst 1 | 2.9 | 598,000 | 365,000 | 1.64 | 0.0219 |
| Catalyst 1 | 2.8 | 563,000 | 347,000 | 1.62 | 0.0229 |
| Catalyst 1 | 3.1 | 599,000 | 385,000 | 1.56 | 0.0257 |
| Catalyst 1 | 2.7 | 571,000 | 329,000 | 1.73 | 0.0245 |
| Catalyst 1 | 2.9 | 634,000 | 406,000 | 1.56 | 0.0244 |
| Catalyst 2 | 3.1 | 530,000 | 289,000 | 1.83 | 0.0351 |
| Catalyst 2 | 3.0 | 550,000 | 349,000 | 1.57 | 0.0323 |
| Catalyst 2 | 2.8 | 536,000 | 318,000 | 1.68 | 0.0297 |
| Catalyst 2 | 2.9 | 573,000 | 373,000 | 1.54 | 0.0327 |
| Catalyst 2 | 2.6 | 575,000 | 371,000 | 1.55 | 0.0311 |
| Catalyst 2 | 2.8 | 541,000 | 310,000 | 1.74 | 0.0304 |
| Catalyst 3 | | | | | 0.002 |
| Catalyst 3 | | | | | 0.002 |

TABLE 1-continued

Polymerization Data.

| Catalyst | Hexene Incorporation (Weight %) | Mw | Mn | Mw/Mn | Yield Polymer (grams) |
|---|---|---|---|---|---|
| Catalyst 3 | | | | | 0.002 |
| Catalyst 3 | | | | | 0.002 |
| Catalyst 3 | | | | | 0.002 |
| Catalyst 3 | | | | | 0.002 |
| Catalyst 4 | | | | | 0.007 |
| Catalyst 4 | | | | | 0.009 |
| Catalyst 4 | | | | | 0.01 |
| Catalyst 4 | | | | | 0.01 |
| Catalyst 4 | | | | | 0.012 |
| Catalyst 4 | | | | | 0.012 |

All documents described herein are incorporated by reference herein, including any priority documents and/or testing procedures to the extent they are not inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process to polymerize olefins comprising:
   A) preparing a supported metallocene catalyst compound by a process comprising:
      1) combining a support with first trialkylaluminum compound(s) selected from the group consisting of triethylaluminum, tri-isobutylaluminum, and tri-n-hexylaluminum; then
      2) calcining the combination of the support and the trialkylaluminum compound(s); then
      3) combining the calcined support with a solvent or diluent and second trialkylaluminum compound(s) selected from the group consisting of triethylaluminum, tri-isobutylaluminum, and tri-n-hexylaluminum; where the first and second trialkylaluminum compound(s) may be the same or different; then
      4) optionally, drying the combination;
      5) combining the combination of the calcined support and the second trialkylaluminum compound(s) with a metallocene catalyst compound and, optionally, a solvent or diluent; then,
      6) optionally, removing the solvent or diluent; then
   B) contacting the supported transition metal catalyst compound with one or more olefins.

2. The process of claim 1 wherein the support is selected from the group consisting of silica, fumed silica, alumina, silica-alumina, magnesia, titania, zirconia, magnesium chloride, montmorillonite, phyllosilicate, zeolites, talc, clays, silica-chromium, silica-alumina, silica-titania, polymeric beads and combinations thereof.

3. The process of claim 1 wherein the support is silica.

4. The process of claim 3 wherein the support has a surface area in the range of from about 10 to about 700 m$^2$/g, and/or a pore volume in the range of from about 0.1 to about 4.0 cc/g and/or an average particle size in the range of from about 5 to about 500 μm.

5. The process of claim 1 wherein the first trialkylaluminum compound comprises triethylaluminum.

6. The process of claim 1 wherein the second trialkylaluminum compound comprises triethylaluminum.

7. The process of claim 1 wherein the first and second trialkylaluminum compounds are triethylaluminum.

8. The process of claim 1 wherein the ratio of aluminum to support element (as determined by XPS) of the calcined support of step 2) to aluminum to support element of the treated support of step 3) is about 2:1 or less.

9. The process of claim 1 wherein the support is silica and the ratio of aluminum to silicon of the calcined support of step 2) to aluminum to silicon of the treated support of step 3) is about 2:1 or less.

10. The process of claim 1 wherein the support is silica and the ratio of aluminum to silicon of the calcined support of step 2) to aluminum to silicon of the treated support of step 3) is about 0.85:1 or less.

11. The process of claim 1 wherein the metallocene catalyst comprises at least two metallocene compounds.

12. The process of claim 1 wherein the metallocene catalyst comprises one or more of:
   rac-dimethylsilyl-bis(indenyl)hafniumdimethyl,
   rac-dimethylsilyl-bis(indenyl)hafniumdichloride,
   rac-dimethylsilyl-bis(indenyl)zirconiumdimethyl,
   rac-dimethylsilyl-bis(indenyl)zirconiumdichloride,
   rac-dimethylsilyl-bis(2-methyl-4-phenyl-indenyl)hafniumdimethyl,
   rac-dimethylsilyl-bis(2-methyl-4-phenyl-indenyl) hafniumdichloride,
   rac-dimethylsilyl-bis(2-methyl-4-phenyl-indenyl) zirconiumdimethyl,
   rac-dimethylsilyl-bis(2-methyl-4-phenyl-indenyl) zirconiumdichloride,
   rac-dimethylsilyl-bis(2-methyl-benzindenyl)hafniumdimethyl,
   rac-dimethylsilyl-bis(2-methyl-benzindenyl) hafniumdichloride,
   rac-dimethylsilyl-bis(2-methyl-benzindenyl) zirconiumdimethyl,
   rac-dimethylsilyl-bis(2-methyl-benzindenyl) zirconiumdichloride,
   rac-dimethylsilyl-bis-(2-methyl-indenyl) zirconiumdimethyl,
   rac-dimethylsilyl-bis-(2-methyl-indenyl) hafniumdimethyl,
   rac-dimethylsilyl-bis-(2-methyl-indenyl) hafniumdichloride,
   rac-dimethylsilyl-bis-(2-methyl-indenyl) zirconiumdichloride,
   rac-dimethylsilyl-bis(2-methyl-4-naphthyl-indenyl)hafniumdimethyl,
   rac-dimethylsilyl-bis(2-methyl-4-naphthyl-indenyl) zirconiumdichloride,
   rac-dimethylsilyl-bis(2-methyl-4-naphthyl-indenyl) hafniumdichloride,
   rac-dimethylsilyl-bis(2-methyl-4-naphthyl-indenyl) zirconiumdimethyl,
   rac-ethylene-bis(indenyl)hafniumdimethyl,
   rac-ethylene-bis(indenyl)hafniumdichloride,
   rac-ethylene-bis(indenyl)zirconiumdimethyl,
   rac-ethylene-bis(indenyl)zirconiumdichloride,
   rac-dimethylsilyl-bis(2-methyl-4-(2'-methyl-phenyl)-indenyl)hafniumdimethyl,
   rac-dimethylsilyl-bis(2-methyl-4-(2'-methyl-phenyl)-indenyl)hafniumdichloride,
   rac-dimethylsilyl-bis(2-methyl-4-(2'-methyl-phenyl)-indenyl)zirconiumdimethyl,
   rac-dimethylsilyl-bis(2-methyl-4-(2'-methyl-phenyl)-indenyl) zirconiumdichloride, rac-dimethylsilyl-bis(2-methyl-4-(4'-methyl-phenyl)-indenyl)hafniumdimethyl,
rac-dimethylsilyl-bis(2-methyl-4-(4'-methyl-phenyl)-indenyl)hafniumdichloride,
rac-dimethylsilyl-bis(2-methyl-4-(4'-methyl-phenyl)-indenyl)zirconiumdimethyl,
rac-dimethylsilyl-bis(2-methyl-4-(4'-methyl-phenyl)-indenyl) zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl -phenyl)-indenyl)hafniumdichloride,
rac-dimethylsilyl-bis(2-methyl-4-(4'-tert-butyl -phenyl)-indenyl)zirconiumdimethyl,
rac-dimethylsilyl-bis(2-methyl-4-(4'-tert-butyl-phenyl)-indenyl) zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl -phenyl)-indenyl)hafniumdichloride,
rac-dimethylsilyl-bis(2-methyl-4-(4'-tert-butyl -phenyl)-indenyl)zirconiumdimethyl,
rac-dimethylsilyl-bis(2-methyl-4-(4'-tert-butyl-phenyl)-indenyl) zirconiumdichloride,
rac-dimethylsilyl-(2-methyl-4-(4'-tert-butyl-phenyl)-indenyl)(2-isoprpyl-4-(4'-tert-butyl-phenyl)-indenyl) hafniumdimethyl,
rac-dimethylsilyl-(2-methyl-4-(4'-tert-butyl -phenyl)-indenyl)(2-isoprpyl-4-(4'-tert-butyl-phenyl)-indenyl) hafniumdichloride,
rac-dimethylsilyl-(2-methyl-4-(4'-tert-butyl -phenyl)-indenyl)(2-isoprpyl-4-(4'-tert-butyl-phenyl)-indenyl)zirconiumdichloride,
rac-dimethylsilyl-(2-methyl-4-(4'-tert-butyl -phenyl)-indenyl)(2-isoprpyl-4-(4'-tert-butyl-phenyl)-indenyl)zirconiumdimethyl,
rac-dimethylsilyl-bis(2-methyl-4,6-diisopropyl-indenyl) hafniumdimethyl,
rac-dimethylsilyl-bis(2-methyl-4,6-diisopropyl-indenyl) zirconiumdimethyl,
rac-dimethylsilyl-bis(2-methyl-4,6-diisopropyl-indenyl) zirconiumdichloride,
rac-dimethylsilyl-bis(2-methyl-4,6-diisopropyl-indenyl) hafniumdichloride,
Bis(cyclopentadieneyl)zirconiumdichloride,
Bis(cyclopentadienyl)zirconiumdimethyl,
Bis(pentamethylcyclopentadieneyl)zirconiumdichloride,
Bis(pentamethylcyclopentadienyl)zirconiumdimethyl,
Bis(cyclopentadieneyl)(pentamethylcyclopentadienyl) zirconiumdichloride,
Bis(cyclopentadienyl)(pentamethylcyclopentadienyl)zirconiumdimethyl,
Bis(1-methyl,4-butylcyclopentadienyl)zirconiumdichloride,
Bis(1-methyl,4-butylcyclopentadienyl)zirconiumdimethyl,
Bis(1-methyl,4-butylcyclopentadienyl)zirconiumdimethoxide,
Bis(1-methyl,4-butylcyclopentadienyl)zirconiumdibenzyl,
Bis(1-methyl,4-butylcyclopentadienyl)zirconiumdifluoride,
Bis(1-methyl,4-butylcyclopentadienyl)zirconiumdiamide,
Bis(1-methyl,4-ethylcyclopentadienyl)zirconiumdichloride,
Bis(1-methyl,4-ethylcyclopentadienyl)zirconiumdimethyl,
Bis(1-methyl,4-benzylcyclopentadienyl)zirconiumdichloride,
Bis(1-methyl,4-benzylcyclopentadienyl)zirconiumdimethyl,
Bis(1-methyl,3-butylcyclopentadienyl)zirconiumdichloride,
Bis(1-methyl,3-butylcyclopentadienyl)zirconiumdimethyl,
Bis(1-methyl,3-n-propylcyclopentadienyl)zirconiumdichloride,
Bis(1-methyl,3-n-propylcyclopentadienyl)zirconiumdimethyl,
Bis(1-methyl,3-iso-propylcyclopentadienyl)zirconiumdichloride,
Bis(1-methyl,3-iso-propylcyclopentadienyl)zirconiumdimethyl,
Bis(1,3-dimethylcyclopentadienyl)zirconiumdichloride,
Bis(1,3-dimethylcyclopentadienyl)zirconiumdimethyl,
Bis(n-propylcyclopentadienyl)zirconiumdichloride,
Bis(n-propylcyclopentadienyl)zirconiumdimethyl,
Bis(n-propylcyclopentadienyl)zirconiumdifluoride,
Bis(n-propylcyclopentadienyl)zirconiumdiamide,
Bis(n-propylcyclopentadienyl)zirconiumdibenzyl,
Bis(n-propylcyclopentadienyl)zirconiumdimethoxide,
Bis(n-propylcyclopentadienyl)hafniumdichloride,
Bis(n-propylcyclopentadienyl)hafniumdimethyl,
Bis(n-propylcyclopentadienyl)hafniumdifluoride,
Bis(n-propylcyclopentadienyl)hafniumdiamide,
Bis(n-propylcyclopentadienyl)hafniumdibenzyl,
Bis(n-propylcyclopentadienyl)hafniumdimethoxide,
Bis(n-butylcyclopentadienyl)zirconiumdichloride,
Bis(n-butylcyclopentadienyl)zirconiumdimethyl,
Bis(tert-butylcyclopentadienyl)zirconiumdichloride,
Bis(tert-butylcyclopentadienyl)zirconiumdimethyl,
Bis(benzylcyclopentadienyl)zirconiumdichloride,
Bis(benzylcyclopentadienyl)zirconiumdimethyl,
Bis(benzylcyclopentadienyl)(pentamethylcyclopentadienyl)zirconiumdimethyl,
Bis(benzylcyclopentadienyl)(pentamethylcyclopentadienyl)zirconiumdichloride,
Bis(propylcyclopentadienyl)(pentamethylcyclopentadienyl)zirconiumdimethyl,
Bis(propylcyclopentadienyl)(pentamethylcyclopentadienyl)zirconiumdichloride,
Bis(propylcyclopentadienyl)(tetramethylcyclopentadienyl)zirconiumdimethyl,
Bis(propylcyclopentadienyl)(tetramethylcyclopentadienyl)zirconiumdichloride,
Bis(tetramethyl,propylcyclopentadienyl)(pentamethylcyclopentadienyl)zirconiumdi methyl,
Bis(tetramethyl,propylcyclopentadienyl)(pentamethylcyclopentadienyl)zirconiumdi chloride,
Bis(tetramethyl,propylcyclopentadienyl)(cyclopentadienyl)zirconiumdimethyl,
Bis(tetramethyl,propylcyclopentadienyl)(cyclopentadienyl)zirconiumdichloride,
Dimethylsilylbis(cyclopentadienyl)zirconiumdichloride,
Dimethylsilylbis(cyclopentadienyl)zirconiumdimethyl,
Dimethylsilylbis(cyclopentadienyl)zirconiumdimethoxide,
Dimethylsilylbis(cyclopentadienyl)zirconiumdiamide,
Dimethylsilylbis(cyclopentadienyl)zirconiumdifluoride,
Dimethylsilylbis(cyclopentadienyl)zirconiumdiiodide,
Dimethylsilylbis(cyclopentadienyl)zirconiumdibromide, Dimethylsilylbis(pentamethylcyclopentadienyl)zirconiumdichloride,
Dimethylsilylbis(pentamethylcyclopentadienyl)zirconiumdimethyl,
Dimethylsilylbis(pentamethylcyclopentadienyl)zirconiumdifluoride,
Dimethylsilylbis(pentamethylcyclopentadienyl)zirconiumdimethoxide,
Dimethylsilylbis(pentamethylcyclopentadienyl)zirconiumdiamide,
Dimethylsilylbis(pentamethylcyclopentadienyl)zirconiumdibromide,
Dimethylsilylbis(pentamethylcyclopentadienyl)zirconiumdibenzyl,
Dimethylsilylbis(cyclopentadienyl)(pentamethylcyclopentadienyl) zirconiumdichloride,
Dimethylsilylbis(cyclopentadienyl)(pentamethylcyclopentadienyl) zirconiumdimethyl,
Dimethylsilylbis(cyclopentadienyl)(pentamethylcyclopentadienyl) zirconiumdimethoxide,
Dimethylsilylbis(cyclopentadienyl)(pentamethylcyclopentadienyl) zirconiumdibromide,
Dimethylsilylbis(cyclopentadienyl)(pentamethylcyclopentadienyl) zirconiumdiamide,
Dimethylsilylbis(cyclopentadienyl)(pentamethylcyclopentadienyl) zirconiumdifluoride,
Dimethylsilylbis(cyclopentadienyl)(pentamethylcyclopentadienyl) zirconiumdibenzyl,
Dimethylsilylbis(1-methyl,4-butylcyclopentadienyl)zirconiumdichloride,
Dimethylsilylbis(1-methyl,4-butylcyclopentadienyl)zirconiumdimethyl,
Dimethylsilylbis(1-methyl,4-butylcyclopentadienyl)zirconiumdimethoxide,
Dimethylsilylbis(1-methyl,4-butylcyclopentadienyl)zirconiumdibromide,
Dimethylsilylbis(1-methyl,4-butylcyclopentadienyl)zirconiumdifluoride,
Dimethylsilylbis(1-methyl,4-butylcyclopentadienyl)zirconiumdiamide,
Dimethylsilylbis(1-methyl,4-butylcyclopentadienyl)zirconiumdimethoxide,
Dimethylsilylbis(1-methyl,4-butylcyclopentadienyl)zirconiumdibenzyl,
Dimethylsilylbis(1-methyl,4-ethylcyclopentadienyl)zirconiumdichloride,
Dimethylsilylbis(1-methyl,4-ethylcyclopentadienyl)zirconiumdimethyl,
Dimethylsilylbis(1-methyl,4-benzylcyclopentadienyl)zirconiumdichloride,
Dimethylsilylbis(1-methyl,4-benzylcyclopentadienyl)zirconiumdimethyl,
Dimethylsilylbis(1-methyl,3-butylcyclopentadienyl)zirconiumdichloride,
Dimethylsilylbis(1-methyl,3-butylcyclopentadienyl)zirconiumdimethyl,
Dimethylsilylbis(1-methyl,3-n-propylcyclopentadienyl)zirconiumdichloride,
Dimethylsilylbis(1-methyl,3-n-propylcyclopentadienyl)zirconiumdimethyl,
Dimethylsilylbis(1-methyl,3-iso-propylcyclopentadienyl)zirconiumdichloride,
Dimethylsilylbis(1-methyl,3-iso-propylcyclopentadienyl)zirconiumdimethyl,
Dimethylsilylbis(1,3-dimethylcyclopentadienyl)zirconiumdichloride,
Dimethylsilylbis(1,3-dimethylcyclopentadienyl)zirconiumdimethyl,
Dimethylsilylbis(n-propylcyclopentadienyl)zirconiumdichloride,
Dimethylsilylbis(n-propylcyclopentadienyl)zirconiumdimethyl,
Dimethylsilylbis(n-butylcyclopentadienyl)zirconiumdichloride,
Dimethylsilylbis(n-butylcyclopentadienyl)zirconiumdimethyl,
Dimethylsilylbis(tert-butylcyclopentadienyl)zirconiumdichloride,
Dimethylsilylbis(tert-butylcyclopentadienyl)zirconiumdimethyl,
Dimethylsilylbis(benzylcyclopentadienyl)zirconiumdichloride,
Dimethylsilylbis(benzylcyclopentadienyl)zirconiumdimethyl,
Dimethylsilylbis(benzylcyclopentadienyl)(pentamethylcyclopentadienyl)-zirconiumdimethyl,
Dimethylsilylbis(benzylcyclopentadienyl)(pentamethylcyclopentadienyl)-zirconiumdichloride,
Dimethylsilylbis(propylcyclopentadienyl)(pentamethylcyclopentadienyl)-zirconiumdimethyl,
Dimethylsilylbis(propylcyclopentadienyl)(pentamethylcyclopentadienyl)-zirconiumdichloride,
Dimethylsilylbis(propylcyclopentadienyl)(tetramethylcyclopentadienyl)zirconiumdimethyl,
Dimethylsilylbis(propylcyclopentadienyl)(tetramethylcyclopentadienyl)zirconiumdichloride,
Dimethylsilylbis(tetramethyl,propylcyclopentadienyl)(pentamethylcyclopenta-dienyl)zirconiumdimethyl,
Dimethylsilylbis(tetramethyl,propylcyclopentadienyl)(pentamethylcyclopenta-dienyl)zirconiumdichloride,
Dimethylsilylbis(tetramethyl,propylcyclopentadienyl)(cyclopentadienyl)-zirconiumdimethyl, and
Dimethylsilylbis(tetramethyl,propylcyclopentadienyl)(cyclopentadienyl)-zirconiumdichloride.

13. The method of claim 1 where the olefins comprise ethylene.

14. The method of claim 1 where the olefins comprise propylene.

15. The method of claim 1 wherein the olefins comprise ethylene and propylene.

16. The method of claim 1 wherein the olefins comprise ethylene and a comonomer selected from the group consisting of propylene, butene, pentene, hexene, heptene, octene, nonene, decene, undecene, dodecene, hexadecene, 4-methylpentene-1, 3-methylpentene-1, 3,5,5-trimethylhexene-1, 5-ethylnonene-1, and isomers thereof.

17. The method of claim 1 wherein the olefins comprise propylene and a comonomer selected from the group consisting of ethylene, butene, pentene, hexene, heptene, octene, nonene, decene, undecene, dodecene, hexadecene, 4-methylpentene-1, 3-methylpentene-1, 3,5,5-trimethylhexene-1, 5-ethylnonene-1, and isomers thereof.

18. The method of claim 1 wherein the polymerization occurs in the gas phase.

19. The method of claim 1 wherein the polymerization occurs in the slurry phase.

* * * * *